Patented Dec. 6, 1938

2,139,629

UNITED STATES PATENT OFFICE 2,139,629

DRY CLEANING PROCESS

William H. Alton, Westport, Conn., assignor to R. T. Vanderbilt Company, Incorporated, New York, N. Y., a corporation of New York No Drawing. Application November 3, 1936, Serial No. 108,978

7 Claims. (Cl. 196—15)

This invention relates to a new dry cleaning process, and more particularly to a new process for the cleaning and purifying of dirty dry cleaning solutions.

In the present system of so-called "dry cleaning" it is customary to place a number of garments in a metal drum similar to those used in laundries and to fill the drum about one-third full of solvent or cleaners' naphtha, carbon tetrachloride, or other solvent, after which the drum is rotated several turns in one direction and then reversed for several turns in the opposite direction, thus forcing the solvent back and forth through the clothes. This is continued for about ten minutes, after which the solvent has turned into a very dirty and discolored solution containing a large amount of suspended dirt, lint and grease from the garments.

At this time, the garments are ready for rinsing in clean solvent or naphtha, and the dirty solvent must be cleaned. A method frequently used at the present time is to circulate the dirty solvent from the washer or drum through a pressure filter to remove suspended dirt, etc., and then to rinse the clothes in the cleaners' solvent, the circulation of the solvent through the clothes and the pressure filter being continued until the dirt is all removed from the garments and the garments have been rinsed in clear solvent, ready for removal from the washer or drum in drying.

Various types of pressure filters are used in this operation, a typical pressure filter consisting of a steel cylinder fitted inside with several filter leaves made of Monel metal screen cloth with a discharge pipe at the lower end leading into a drain which drains back into the washer or drum, or into a storage tank as desired.

While the metal screen cloth used on the filter leaves is as finely woven as possible, a screen having a 20 x 100 mesh or finer being common, the openings in the screen cloth are too large to strain out the suspended matter from the dirty solvent. Accordingly, it is common to either pre-coat the filter leaves with a paste of a finely pulverized mineral by suspending some of the finely pulverized mineral in the drum or washer in a quantity of solvent and pumping the solvent with the suspended mineral through the filter until a layer of the mineral is built up on each filter leaf, or else to add to the solvent during the washing or dry cleaning operation, a finely pulverized mineral, such as pyrophyllite, so that when the solvent is pumped through the filter the pulverized material builds up a layer on the filter leaves. In either case, there is formed on the filter leaves a layer of pulverized material, such as pyrophyllite or the like, which forms a filtering layer or filter cake which exerts a fine straining action on the dirty solvent, so that suspended dirt, etc. is removed.

While such processes effectively remove suspended dirt and other material from the solvent, little or no decolorizing action is exerted, so that the solvent becomes discolored, and after being used for a certain period of time, is so discolored that it cannot be used for rinsing white garments, or light colored garments. Such discolored solvent is commonly subjected to steam distillation to decolorize it, with corresponding cost of fuel and labor. Also, in view of the rapidity with which the solvent becomes discolored, it is necessary to either have stills of sufficient capacity to distill the solvent as fast as discolored, even in peak seasons, or else, during such seasons, to use badly discolored and contaminated solvents.

It is known that discolored and dirty solvents may be purified and cleaned and decolorized by treatment with sulfuric acid, which precipitates the impurities as a sludge, with subsequent washing with a caustic to neutralize the acid. This method of purifying and decolorizing the solvent cannot be used while the solvent is in the drum or washer, or with the same pressure filter as is used in the process, because the sludge or precipitate following the acid treatment is a slimy paste which tends to adhere to, and to build up on, the inner surfaces of the drum or washer and to clog up pipe connections, such that its use by methods previously suggested is impractical.

The present invention provides a process by which the discolored and dirty solvent may be treated with sulfuric acid to precipitate the impurities as a sludge, and to purify the solvent, without the sludge or precipitate forming a coating on the drum or washer, or clogging up the pipe connections and thus makes possible the acid treatment of the solvent, while the solvent is in the drum or washer, or other mixing drum, with removal of the impurities in a pressure filter, and without objectionable precipitation on the apparatus. Hydrochloric, perchloric or phosphoric acids may be used in place of sulfuric acid, although in general these acids are not as effective as sulfuric acid.

In accordance with the present invention, the discolored and dirty solvent is placed in the drum or washer or other suitable mixing tank and to it is added a suitable quantity of a finely pulverized contact or adsorbent material, such as pyrophyllite, talc, diatomaceous or infusorial earth, mineral wool, glass wool, finely divided asbestos fibres, etc. The solvent is agitated until this finely divided or pulverized material is thoroughly dispersed throughout the solvent, and a sufficient quantity of sulfuric acid to precipitate the impurities in the solvent is added. The agitation is continued to bring the acid into intimate contact with the dirty solvent, with rapid precipitation of the sludge which forms onto the finely divided particles of the dispersed mineral. In this way, the sludge or precipitate which is formed, and which carries the impurities from the solvent, is deposited on the dispersed material, rather than on the walls or surfaces of the mixing tank or the pipe connections. The solvent, with the dispersed finely divided mineral carrying the precipitated sludge, is then pumped through the pressure filter, which removes the mineral and the sludge deposited thereon. The finely divided mineral, and the sludge deposited thereon, are easily and cleanly separated from the solvent in the filter and the solvent passes through the filter leaves as a purified and water-white solvent. If an excess of acid is used, lime or other suitable alkali or basic substance may be added to neutralize it.

A finely divided or pulverized contact material which is particularly advantageous for use in this process is pyrophyllite prepared in a graduated scale of fineness as described and claimed in my Patent No. 2,018,507, patented October 22, 1935.

The amount of finely divided mineral, and sulfuric acid, required for the purification and refining of the dirty solvent will, of course, vary with the nature of the solvent, the nature and amount of dirt suspended therein, and the nature and extent of the discoloration. In a typical case, which will serve to illustrate the invention, four parts of pyrophyllite were dispersed in about fifty parts of dirty solvent, and one part of sulfuric acid was added thereto. The mixture was agitated until the impurities were separated from the liquid and precipitated on the suspended pyrophyllite, whereupon the mixture was passed through a filter which separated the pyrophyllite and the precipitated material deposited thereon, yielding the solvent in a clear, water-white, refined state.

The process is not confined to the use of the drums or washers commonly available in dry cleaning establishments, or to the use of the pressure filters commonly used, since any suitable mixing tank may be used, and any suitable filter, including suction and gravity filters, can be used; the essence of the invention being the use of the solvent for dry cleaning purposes, and the purification of the dirty solvent by the addition thereto, first of a finely divided or pulverized mineral, and secondly of a quantity of sulfuric acid sufficient to precipitate the impurities from the dirty solvent as a sludge which is precipitated on the finely divided mineral which has already been suspended in the solvent. It is important to suspend the finely divided mineral in the solvent before adding thereto the sulfuric acid, as otherwise the precipitated sludge, which is in the form of a gelatinous or slimy paste, deposits on the surface of the mixing tank or drum or washer, and in the pipes and other connections, such that the pipes and connections become clogged up, and the surfaces of the tanks or drums become coated with the gelatinous sludge.

I claim:

1. In the dry cleaning of fabrics, the improvement which comprises adding to the dirty dry cleaning liquid a pulverized adsorbent mineral and then adding a mineral acid effective to precipitate dirt and other impurities, and agitating, whereby the dirt and other impurities are precipitated as a sludge which is deposited on the fine particles of the pulverized mineral material.

2. In the dry cleaning of fabrics, the improvement which comprises adding to the dirty dry cleaning liquid a pulverized adsorbent mineral and then adding a mineral acid effective to precipitate dirt and other impurities, and agitating, whereby the dirt and other impurities are precipitated as a sludge which is deposited on the fine particles of the pulverized mineral material, and removing the mineral and the precipitate deposited thereon from the dry cleaning liquid by filtration.

3. In the dry cleaning of fabrics, the improvement which comprises suspending in the dirty dry cleaning liquid a small quantity of finely divided pyrophyllite, then adding a small amount of sulfuric acid to precipitate the suspended dirt and other impurities in the dry cleaning liquid as a sludge which deposits on the suspended particles of pyrophyllite.

4. In the dry cleaning of fabrics, the improvement which comprises suspending in the dirty dry cleaning liquid a small quantity of finely divided pyrophyllite, then adding a small amount of sulfuric acid to precipitate the suspended dirt and other impurities in the dry cleaning liquid as a sludge which deposits on the suspended particles of pyrophyllite, and removing the suspended pyrophyllite and the precipitate deposited thereon from the dry cleaning liquid by filtration.

5. The process of refining and purifying discolored dry cleaning liquid which comprises suspending therein a small proportion of a finely divided adsorbent mineral and then adding a small amount of sulfuric acid with agitation, whereby the discoloring elements are precipitated from the solvent as a deposit on the suspended material, and removing the suspended material and the precipitate deposited thereon from the dry cleaning liquid by filtration.

6. The process of refining and purifying discolored dry cleaning liquids which comprises suspending therein a small proportion of finely divided pyrophyllite, then adding a small amount of sulfuric acid with agitation whereby the discolored elements are precipitated from the dry cleaning liquid as a sludge which is deposited on the particles of pyrophyllite, and removing the pyrophyllite and the precipitate deposited thereon from the dry cleaning liquid by filtration.

7. In the dry cleaning of fabrics, the improvement which comprises adding to the dirty dry cleaning liquid finely divided pyrophyllite and then adding a mineral acid effective to precipitate dirt and other impurities, and agitating, whereby the dirt and other impurities are precipitated as a sludge which is deposited on the fine particles of the pyrophyllite.

WILLIAM H. ALTON.